(12) United States Patent
Shahani et al.

(10) Patent No.: US 8,090,669 B2
(45) Date of Patent: Jan. 3, 2012

(54) ADAPTIVE LEARNING FRAMEWORK FOR DATA CORRECTION

(75) Inventors: Ravi Shahani, Redmond, WA (US); Siarhei Alonichau, Bothell, WA (US); Benjamin Childs, Sharon, VT (US)

(73) Assignee: Microsoft Corporation, Redmond, WA (US)

(*) Notice: Subject to any disclaimer, the term of this patent is extended or adjusted under 35 U.S.C. 154(b) by 908 days.

(21) Appl. No.: 12/115,551

(22) Filed: May 6, 2008

(65) Prior Publication Data

US 2009/0281972 A1 Nov. 12, 2009

(51) Int. Cl.
*G06F 15/18* (2006.01)
(52) U.S. Cl. .......................................... 706/14
(58) Field of Classification Search .................. None
See application file for complete search history.

(56) References Cited

U.S. PATENT DOCUMENTS

| | | | |
|---|---|---|---|
| 5,956,739 A | 9/1999 | Golding et al. | |
| 6,556,841 B2 | 4/2003 | Yu | |
| 6,732,333 B2 | 5/2004 | Selby | |
| 6,782,510 B1 | 8/2004 | Gross et al. | |
| 7,146,381 B1 | 12/2006 | Allen et al. | |
| 7,254,773 B2 | 8/2007 | Bates et al. | |
| 7,263,657 B2 | 8/2007 | Soin et al. | |
| 7,290,209 B2 | 10/2007 | Brill et al. | |
| 7,937,657 B2 * | 5/2011 | Bates et al. | 715/257 |
| 2002/0156816 A1 * | 10/2002 | Kantrowitz et al. | 707/530 |
| 2006/0235687 A1 * | 10/2006 | Carus et al. | 704/252 |
| 2007/0106937 A1 | 5/2007 | Cucerzan et al. | |
| 2007/0260564 A1 | 11/2007 | Peters et al. | |

OTHER PUBLICATIONS

Seth, Deepak et al.; "SSCS: A Smart Spell Checker System Implementation Using Adaptive Software Architecture"; 2003; Springer-Verlag Berlin Heidelberg; pp. 187-197.*
Al-Mubaid, Hisham et al.; "Machine Learning Approach for Context-Sensitive Error Detection"; 2005; Proc. Int'l Conf. Intelligent Computing and Information Systems; 8 pages.*
QasemiZadeh, Behrang et al.; "Adaptive Language Independent Spell Checking Using Intelligent Traverse on a Tree"; 2006; 2006 IEEE Conference on Cybernetics and Intelligent Systems; 6 pages.*
Taghva et al., "OCRSpell: An Intractive Spelling Correction System for OCR Errors in Text", May 1996.
Carlson et al., "Scaling Up Context-Sensitive Text Correction", 2001, American Association for Artificial Intelligence.

* cited by examiner

*Primary Examiner* — Jeffrey A Gaffin
*Assistant Examiner* — Stanley K Hill

(57) ABSTRACT

Architecture that employs adaptive learning algorithms to adapt a data correction tool to user-specific behavior during runtime. The architecture includes a framework for training and measuring adaptive learning algorithms, adapting the current text correction tool codebase, and one or more different adaptive learning algorithms. This enables a text correction system to adapt the behavior of the text correction system to an individual user based on the user's interaction with the data correction system. This also facilitates the testing and improvements in an adaptive learning algorithm at the vendor before shipping in a product to the end-user. This reduces the risk of shipping a feature the precise behavior of which is different for each user.

20 Claims, 11 Drawing Sheets

ADAPTIVE LEARNING FRAMEWORK FOR DATA CORRECTION

BACKGROUND

Data correction features such as applied to textual data are typically designed to have the same behavior or output for all users based on a particular user input. This behavior is then fixed at the time when the product in which the feature is incorporated ships. For example, spell checkers have existed for some time but with limited capabilities. The checker is typically shipped with a limited dictionary of terms that attempts to check the spelling of words that users will mistype, misspell, etc. It is then left to the user to build up the dictionary with the corrections to terms that the user will typically need checked when editing documents or entering text.

This deficiency applies not only to text entry, but also to linguistics, punctuation, grammar, and different languages for which product features are to be included. The conventional processes attempt to address the needs of a dominant set or broad market of general users, and therefore, do not assist those users who can benefit from more specialized correction techniques.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a mechanism for computing the quality of an adaptive learning algorithm at the vendor, and then shipping the adaptive learning algorithm to the end-user. The adaptive learning algorithm enables a personalized data (e.g., text) correction system by adapting its correction behavior to the end-user based on the user's interaction. At the vendor, a training corpus is employed that provides original uncorrected text (e.g., sentences, terms, phrases) obtained from different data sources, such as email, blogs, communities, etc.

Initially, the corpus is obtained and processed to annotate the original corpus text for actual errors resulting in a training corpus of original text and corrected text. A testing framework processes the training corpus through a correction tool which flags possible errors of the training corpus text based on an error correction model. The flags are then processed by the testing framework using one or more user models that generate simulated user actions. These actions are passed to an adaptive learning algorithm to learn from the input actions and then provide an updated error correction model from which the correction tool operates. Ultimately, when testing has completed, the results are output as a measure of how well the learning algorithm performed.

This pre-distribution testing reduces the risk of shipping a feature the precise behavior of which is different for each user. Additionally, the testing and adaptation processes can be performed at the corporate level for internal use to provide more focused error flagging and correction based on terms and technology predominantly employed by the corporation or at the group level, for example.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
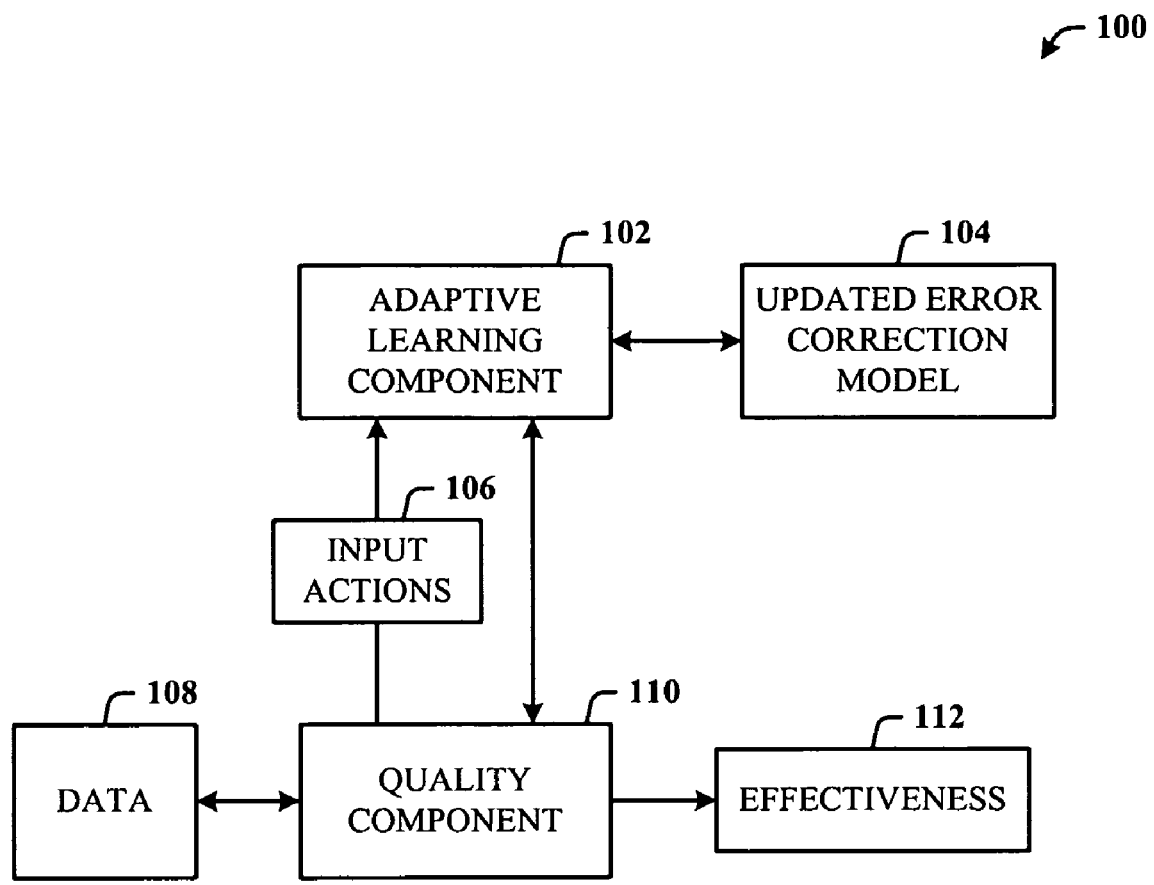
FIG. 1 illustrates a computer-implemented data correction system.

The disclosed architecture employs adaptive learning algorithms to adapt a text correction tool to user-specific behavior during runtime. The architecture includes a framework for training and measuring the quality of adaptive learning algorithms prior to distribution to a consumer, adapting the current text correction tool codebase, and one or more different adaptive learning algorithms. Once deployed to the end-user, the learning algorithm then can further adapt to the end-user to provide a more effective text and/or grammar correction experience.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented data correction system 100. The system 100 includes an adaptive learning component 102 for learning an updated error correction model 104 based on input actions 106 (e.g., simulated user actions) related to the correction of data 108 (e.g., training data), and a quality component 110 for computing effectiveness 112 of the adaptive learning component 102 for learning the error correction model 104. The data 108 can be obtained from different data sources such as from word processing documents, email message documents, blogs, newsgroups, for example, all of which can provide textual terms, phrases, sentences, etc., The system 100 can be employed to determine the effectiveness 112 as a measure of quality of the adaptive learning component 102 (e.g., an algorithm) for learning, before the adaptive learning component 102 is shipped as a product or in a product to consumers. The adaptive learning component 102 can comprise multiple learning algorithms each employed for a specific purpose and each tested for effectiveness. The quality component 110 can include multiple different types of functionality in the form of tools that facilitate the testing, analysis, metric generation, error correction, data handling and management instructions, for example, between test entities, all in support of producing the effectiveness 112. The effectiveness 112 can be represented as a single score, a series of different scores for correspondingly different features, reports, etc., which can provide a measure as to the quality of the learning process associated with the learning component 102.

Figure 2:
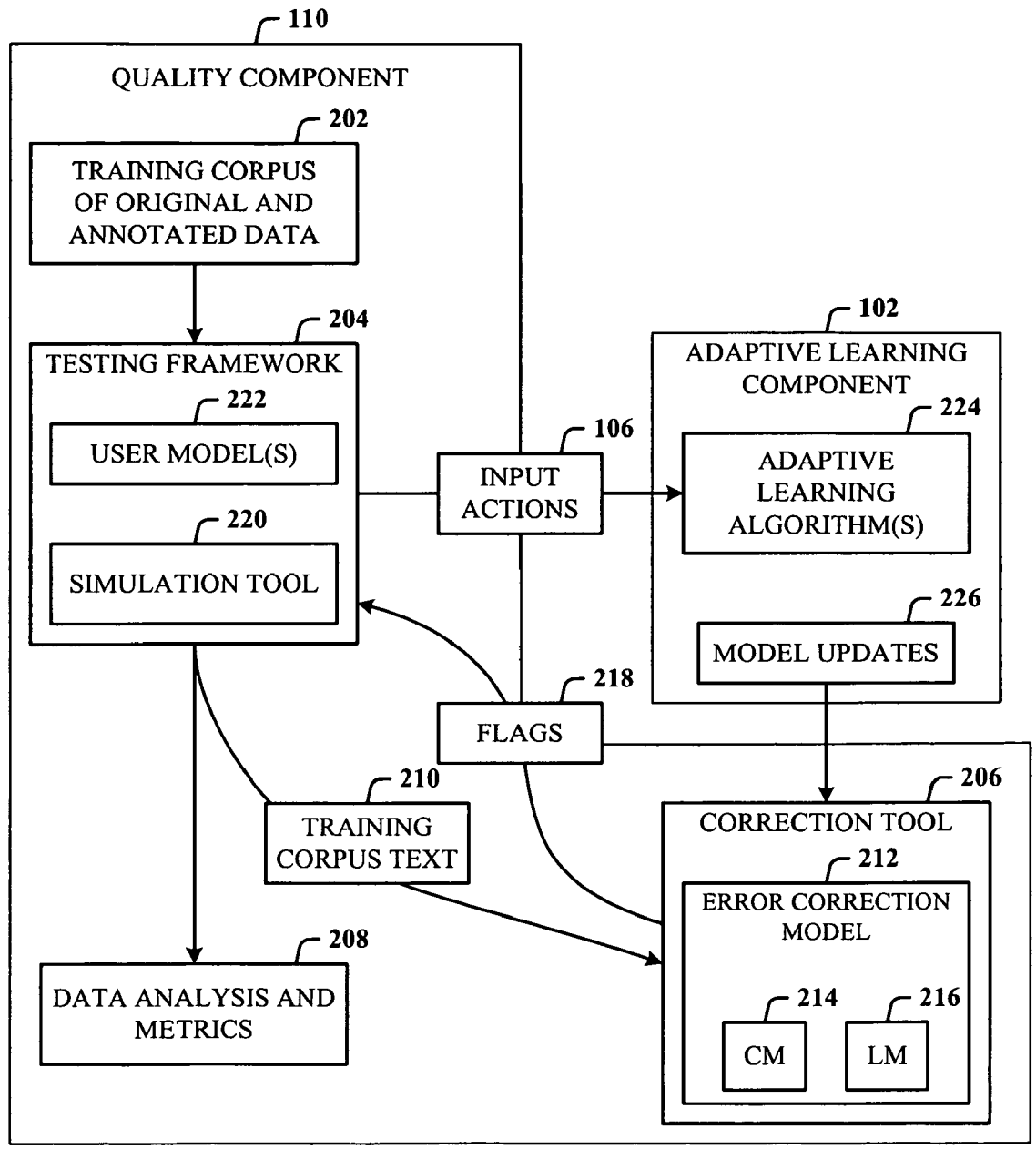
FIG. 2 illustrates a system and flow between entities of the system for computing effectiveness of adaptive learning algorithm(s).

FIG. 2 illustrates a more detailed diagram of an exemplary data correction system 200 and flow between entities of the system 200. In this particular depiction, the quality component 110 and adaptive learning component 102 are shown to include entities that cooperate to provide the effectiveness information. It is to be understood, however, that association of the entities as shown is not to be construed as limiting in any way, but is provided for description purposes only.

The quality component 110 of the system 200 can include a training corpus 202 (e.g., the data 108 of FIG. 1), a testing framework 204, a correction tool 206 and, data analysis and metrics 208 (the effectiveness 112 of FIG. 1). The following description will in terms of the data being text. However, it is to be understood that the testing, learning and correction, for example, can be applied to data in general.

Initially, a corpus is provided with "raw" original text. The training corpus 202 can be obtained from users and sources in a corporate enterprise, and can be specific to certain applications (e.g., a word processor, email, etc.). For example, the corpora can be obtained from office application, specifications, internal corporate blogs, external blogs, newsgroups, communities, etc. Corpora originating from the corporation can be preserved in its entirety and provide a good source of training data. The corpus of original text is then processed to annotate real errors in the original text, resulting in the training corpus 202 of original text and annotated text. The annotations can be performed manually and/or automatically. The corpus 202 is processed through the correction tool 206 to apply flags 218 to possible errors of the original and annotated text.

In operation, portions of the training corpus 202 such as training corpus text 210 (e.g., textual strings such as sentences or phrases) are obtained by the testing framework 204 and sent to the text correction tool 206 for processing based on an error correction model 212. The error correction model 212 can include a channel model (CM) 214 and a language model (LM) 216. The CM 214 describes possible corrections to text such as "from" to "form", "ill" to "I'll", and so on. The LM 216 is a broad spectrum of terms in common use by users. The LM 216 looks at more than one word such as in word sequences and provides the probabilities of a word in the CM 214 belonging in a sequence. In other words, the CM 214 provides possible words, and the LM 216 provides a context in which the word may be used, as a means to flagging the word as a possible error. The CM 214 and LM 216 ship as the error correction model 212 with the correction tool 206 for use by the end-user.

The text correction tool 206 then generates flags 218 on the training corpus text 210 based on the error correction model 212 and returns the flags 218 to the testing framework 204. A simulation tool 220, as part of the testing framework 204, generates simulated input actions 106 based on a user model 222. The user model 222 describes how a theoretical user might behave. One or more user models can be employed to cover a spectrum of user types (e.g., very adept at text usage and grammar, poor text usage, etc.).

The input actions 106 are passed to one or more adaptive learning algorithm(s) 224 that process the actions 106 and send error correction model updates 226 to the error correction model 212 of the text correction tool 206, resulting in an updated error correction model 212. The testing framework 204 then records and outputs the performance analysis and metrics 208 to other processes. The process iterates over all portions of the training corpus 202 and outputs the metrics 208 for each set of text 210 (e.g., a sentence) processed from the corpus 202. Thus, the system 200 iterates on each set of text 210 from the corpus 202 until the corpus 202 has been processed in its entirety.

The correction tool 206 can be employed in a client-based end-user application (e.g., word processing application) to process user actions to data (e.g., text) in a document based on the error correction model 212. The end-user receives the baseline error correction model 212 as developed and tested at the vendor.

In an alternative implementation, the end-user application includes the adaptive learning component 102 as part of the product distribution to the consumer. The adaptive learning component 102 then extends the baseline error correction model 212 based on individualized model updates 226 to the baseline error correction model 212 according to user input actions (realtime user actions) to the text as received and processed.

In a more robust implementation, the quality component 110 further tests the effectiveness of the adaptive learning component 102 to learn the updated error correction model related to checking grammar and/or spelling in the document.

A first step in developing the user model(s) 222 as the testing framework 204 can be to collect data that is considered to be representative of user text and associated interaction with the text correction tool 206. This is used to validate the one or more adaptive algorithms 224 implemented. Corpora from external sources can be processed to preserve the correction tool flags 218 with the flag positions in a document and surrounding context, and any occurrence of a word with context that has a text correction tool flag somewhere in the corpus. This is for counting how often the word is used without being flagged.

Corpora is run through the text correction tool 206, where the tool 206 can be run more aggressively than a default setting, and the results are flagged using a GUI of the correction tool 206. A goal is to flag possible errors in the original text and annotated (or corrected) text in the training corpus 202 based on the current error correction model 212. The correction tool 206 can be configured to run aggressively, if desired.

The input actions 106 can be modeled as follows. For every good flag of the flags 218, a user (as defined by the user model 222) will have some probability $P_G$ of correctly thinking the flagged text is good. For every bad flag (of the flags 218), the user will have some probability $P_B$ of correctly thinking the flagged text is bad. For every flag that the user thinks is good, the user explicitly accepts the flagged text with a probability $P_A$. For every flag the user thinks is bad, the user explicitly ignores the flagged text with probability $P_I$.

The first two probabilities ($P_G$ and $P_B$) essentially model how "smart" the user is. The second two probabilities ($P_A$ and $P_I$) model how the user interacts with the application that employs the correction tool 206. Aggregate values of $P_G$ and $P_B$ can be estimated based on front-end data, but in general, all four probabilities of these values can vary per user. An approach to accounting is to pick a set of discrete values for each of these variables and consider each combination of values to represent some set of users.

The front-end data involves collecting sentences from users on which the correction tool 206 generates a flag that the user explicitly ignored (e.g., right-clicked and selected "Ignore"). These sentences are uploaded from the user's machine to servers. User accuracy rates have been measured on such sentences. Additionally, there can be accuracy metrics that are generated internally on the accuracy of the correction tool 206. Assuming that the accuracy metrics are representative of the user experience, these two pieces of information can then be used to compute the probability that users correctly identify good flags (probability $P_G$).

With respect to the adaptive learning algorithms 224, one or more adaptive learning algorithms can be implemented, each of which has parameters that can be varied statically to tune the behavior of the associated algorithm. The algorithms 224 can be used in a combination of the following concepts:

The flags that a user ignores are noted. If the user ignores a flag on an infrequent word more than N times (where N could be 1) without accepting any flags, stop flagging the word. This prevents the repeated flagging of jargon. Each time the user explicitly ignores a flag, a bias is created against that flag; each time the user accepts a flag, a bias is created for the flag. Each time the user types a word (or text) that would not be flagged with the default settings, a bias is created against flagging that word. The frequency of a word that may be flagged in a user's desktop search index can be checked. If the frequency is significantly higher than expected, and there is sufficient data in the index that this is statistically significant, a bias is created against flagging. The kinds of orthographic errors a user makes (e.g., character or word transpositions) can be noted, and these kinds of contextual spelling errors are boosted.

In general, the total amount that can be biased for or against flagging can be limited. Additionally, a bias towards flagging is created if the default settings would have generated a flag on a word. A limited history of user events can be utilized in case the user's behavior changes over time.

The mechanism through which bias is processed is by adding/subtracting to a threshold used in scoring. An offset for a particular channel model pair, a particular error type, or for all flags, can be biased.

In one implementation, an API (application program interface) can be added to provide notification when a flag is ignored. A word processing application, for example, can call the notification. Implicit accepts and ignores can also be considered. Implicit accepts are considered so as not to slowly bias away from flagging everything for users who retype words, rather than using a context menu (or foreground dialog) to accept suggestions. Implicit ignores can be considered if boosting (biasing) flags beyond the default settings.

The effectiveness data in the form of data analysis and metrics 208 can be reported from the testing framework 204 in terms of improvements and regressions per unit of text, change in overall precision, and potentially, change in overall recall if a particular error rate and base recall rate is assumed.

The correction tool 206 can be tested based on multiple iterations of the same training corpus text 210 (since the input actions 106 are probabilistically determined), vary parameters to the user model 222, and regenerate results, etc.

A good initial source of the training corpus 202 can be a developer test set. In other words, a corpus is developed for use in measuring or improving accuracy of the underlying tool, the behavior of which is being adapted. This set can have many original sets of text and annotations to the original text; however, this set does not have to come from a single user.

The CM 214 can be constructed with default values (or the channel model threshold offset can be ignored) and the closeness of a given adaptation algorithm to coming up with the CM values used for English, observed. Another source of training corpus 202 can be a product management team for a word processor, for example, since members of the team can have interesting amounts of jargon that the text correction tool 206 would perform poorly on. Other sources can include emails, message from other messaging systems (e.g., instant messaging), audio conversations, etc.

Training of the adaptive learning algorithms 224 can include the same processes described above, but by also varying the parameters to each adaptive model, and using a different corpus than that used for testing.

Several different adaptive learning algorithms 224 can be employed separately or in combination that address the testing and learning processes described herein. One such algorithm is referred to as SimpleCM. SimpleCM is an algorithm that adds a specified value to the CM adjustment for a particular pair when a suggestion is accepted or rejected. Parameters include AcceptScore which is a value to add when a suggestion is accepted, and RejectScore which is a value to add when a suggestion is rejected.

Another algorithm, similar to the SimpleCM algorithm, is CappedStabilizingCM. CappedStabilizingCM has additional parameters that can be used to adjust the scores over time (e.g., reducing the score that is added to the channel model as more data is retrieved). In addition, there are parameters that can set a limit (a "cap") on the maximum adjustment score both for upper and lower limits. These cap parameters facilitate the specification of an adaptive learning algorithm that does not make huge adjustments in the beginning of the learning phase and tends to stabilize once a large amount of data is recorded. The parameters for the capped stabilizing CM algorithm include the following.

| Parameter | Description |
| --- | --- |
| BaseAcceptScore | The starting value for the AcceptScore |
| EndAcceptScore | The ending vale for the AcceptScore |
| BaseRejectScore | The starting value for the RejectScore |
| EndRejectScore | The ending value for the RejectScore |
| AcceptScoreSpeed | The speed of change for the accept score (larger values = lower speed . . . 2 is twice as slow as 1 . . . ) |
| RejectScoreSpeed | The speed of change for the RejectScore |
| AcceptScoreMidPoint | The number of inputs after which the AcceptScore will be half way between the base and the end |
| RejectScoreMidPoint | The number of inputs after which the RejectScore will be half way between the base and the end |
| UpperCap | The absolute maximum score that can be reached |
| LowerCap | The absolute minimum score that can be reached |
| UpperCapSpeed | The speed of approach to the maximum score (larger values = lower speed) |
| LowerCapSpeed | The speed of approach to the minimum score |

Figure 3:
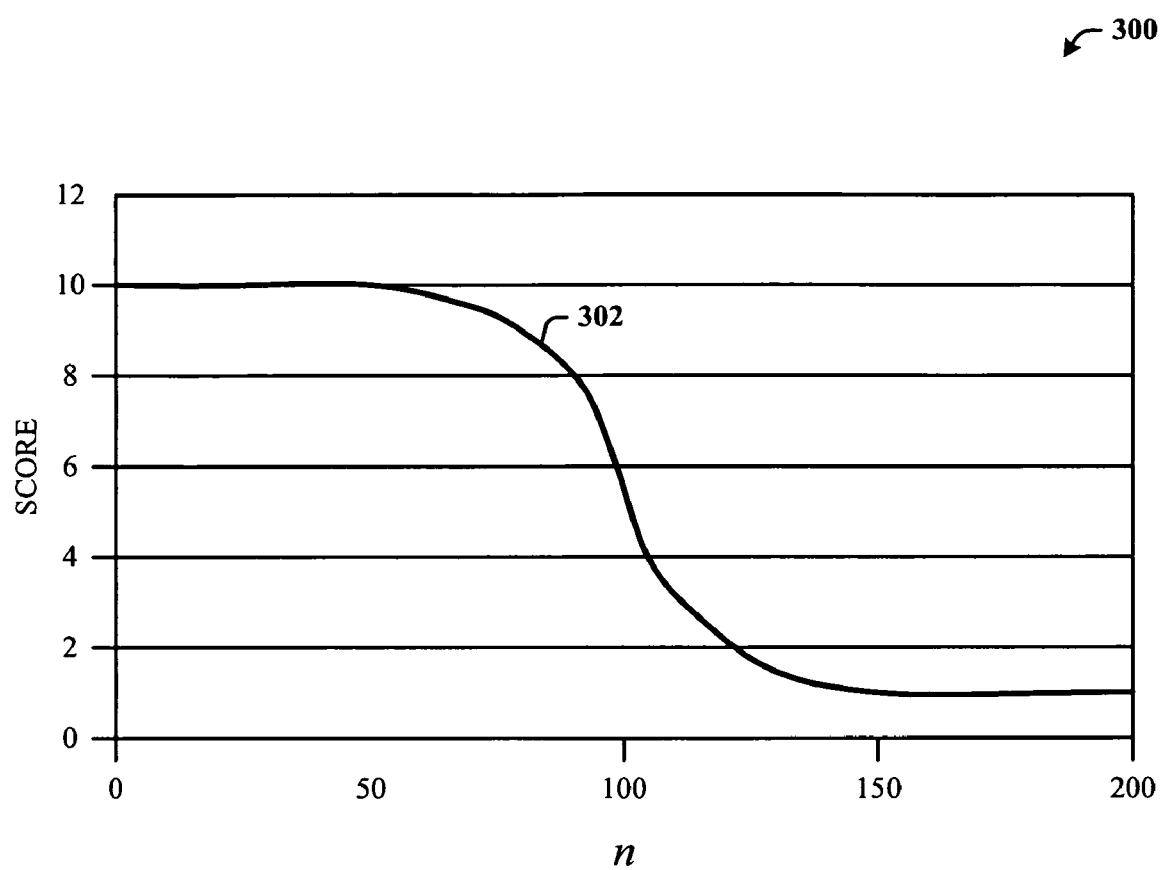
FIG. 3 illustrates a graph of a curve for modeling the stabilization of values.

A stabilizing function $f(n)$ used to model stabilization of values can be the following:

$$f(n = \#\text{inputs}) = \frac{(\max - \min)}{1 + e^{\left(\frac{n + midpoint}{speed}\right)}} + \min$$

where max is the starting score, min is the ending score, n is the current number of inputs (#inputs), midpoint is the point where the score is halfway between max and min, speed is the speed of change, and e is the Euler function. FIG. 3 illustrates a graph 300 of a curve 302 for modeling the stabilization of values. Here, the function $f(n)$ parameters are set to max=10, min=1, midpoint=100, and speed=10, over a range of n values from 0 to 200.

A capping function g(n) used to model the capping of values can be as follows:

$$g(n = \#\text{inputs}) = cap \cdot \left(\frac{1}{1 + \frac{n}{speed}} + 1\right)$$

where n is the current number of inputs (#inputs), speed is the speed of change, and cap is a value that limits the score.

Alternatively, the data correction system 200 comprises the adaptive learning component 102 for learning the update error correction model 212 related to correction of text (e.g., data 108) of a document created via a word processor and updating the language model of the word processor. The system 200 also includes the text correction tool 206 of a word processor for flagging new text (e.g., flags 218) for correction based on the updated error correction model 212. The system 200 also includes the quality component 110 for computing effectiveness of the adaptive learning component 102 for learning the updated error correction model by flagging possible errors in the original and annotated text (e.g., training corpus text 210) of the training corpus 202 based on the error correction model 212 of the text correction tool 206.

The adaptive learning component 102 can include an adaptive learning algorithm 224 that adjusts the channel model 214 based on the scores associated with acceptance or rejection of the suggested text correction, the adaptive learning algorithm 224 adjusts the scores over time, and limits score adjustment based on at least one of a maximum limit or a minimum limit.

Figure 4:
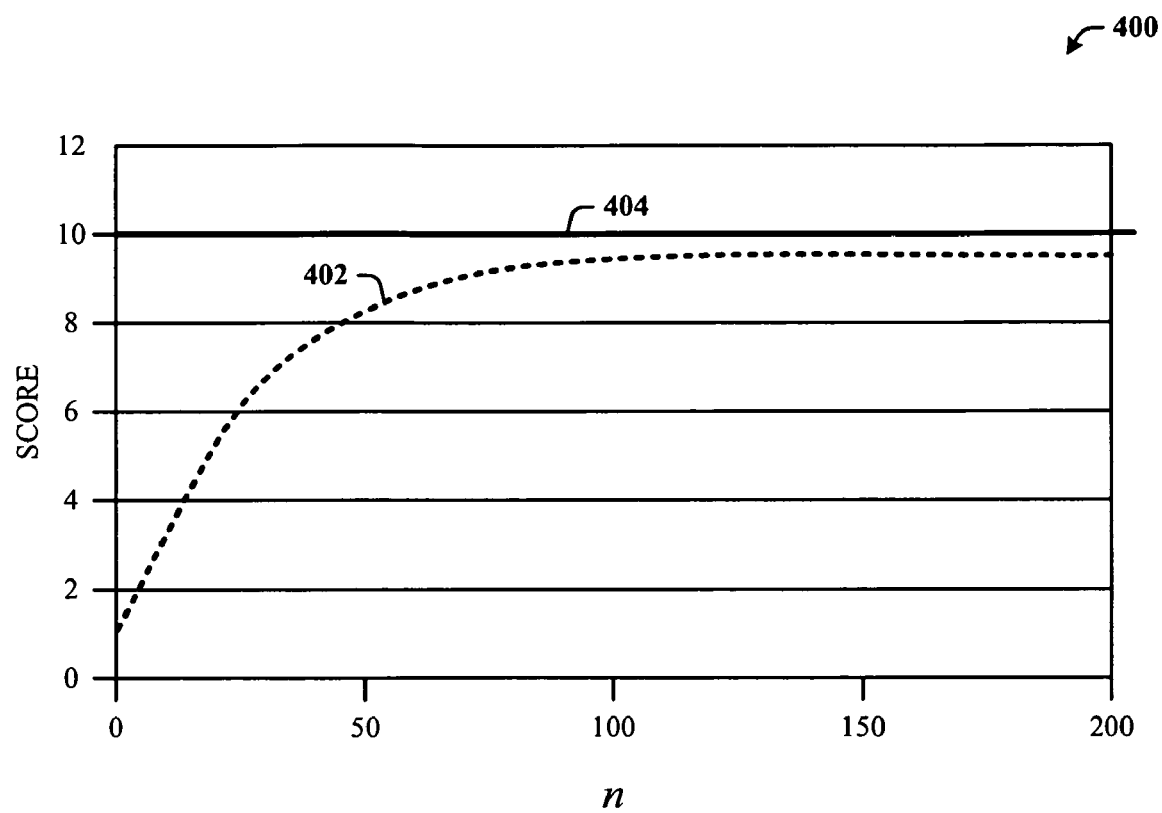
FIG. 4 illustrates a graph of an example capping curve for modeling capping values at an upper cap.

FIG. 4 illustrates a graph 400 of an example capping curve 402 for modeling capping values at an upper cap 404. Here, the capping function g(n) is the curve 402 generated based on parameters are set to cap=10 and speed=10 over a range of n values from 0 to 200.

The SimpleLM adaptive learning algorithm updates a user LM adjuster (as part of the LM 216 of FIG. 2 by incrementing counts as the adjuster is passed trigrams. The SimpleLM algorithm works on the assumption that each subsequent (overlapping) trigram is passed to the algorithm. Thus, given weights (w1 w2 w3), the SimpleLM algorithm adds (w1 w2 w3) and (w1 w2) n-grams to the adjuster.

In addition, the SimpleLM adaptive learning algorithm supports updating the user LM adjuster based on suggestions accepted or rejected. When a suggestion is accepted or rejected, the trigram counts for the three trigrams contained in a context window can be incremented or decremented by some number.

The testing framework 204 is designed to allow easy addition of different adaptive learner algorithms. The following steps outlined a way for adding a different algorithm:
1. Create new class inheriting from the text correction tool 204 (also denoted herein as CSS) CSSAdaptiveLearner.
2. Implement SetParameter and GetParameters methods.
   a. The Set Parameter method allows the user to set a parameter on the learning algorithm-following is an example implementation:

```
const WCHAR* CSimpleCMLearnerAcceptScoreName =
L"AcceptScore";
const WCHAR* CSimpleCMLearnerRejectScoreName =
L"RejectScore";
void CSimpleCMLearner::SetConfigurationParameter(const
            CSSAdaptiveLearnerConfigParam& parameter)
{
    // Accept Score
    if(CheckAndLoadParameter<float, FloatType>(parameter,
            CSimpleCMLearnerAcceptScoreName,
            m_acceptScore))
        return;
    // Reject Score
    if(CheckAndLoadParameter<float, FloatType>(parameter,
            CSimpleCMLearnerRejectScoreName,
            m_rejectScore))
        return;
}
``` b. The GetParameters method returns a list of all available parameters for the algorithm:

```
CArray<CSSAdaptiveLearnerConfigParam>*
        CSimpleCMLearner::GetConfigurationParameters(
        )
{
    CArray<CSSAdaptiveLearnerConfigParam>* parameterArray
        = new
        CArray<CSSAdaptiveLearnerConfigParam>( );
    parameterArray->SetArraySize(2);
    // Accept Score
    CreateParameter<float,
        FloatType>((*parameterArray)[0],
        CSimpleCMLearnerAcceptScoreName,
        m_acceptScore);
    // Reject Score
    CreateParameter<float,
        FloatType>((*parameterArray)[1],
        CSimpleCMLearnerRejectScoreName,
        m_rejectScore);
    return parameterArray;
}
```

3. To support this algorithm in the test framework 204:
   a. Add a new value to AdaptiveLearnerType.
   b. Add a new case to the constructor of AdaptiveLearner.
4. Finally, override the desired events: one or more of SuggestionAccepted, SuggestionRejected, SuggestionUnflagged, TrigramProcessed, TrigramAccepted, and TrigramRejected.

Figure 5:
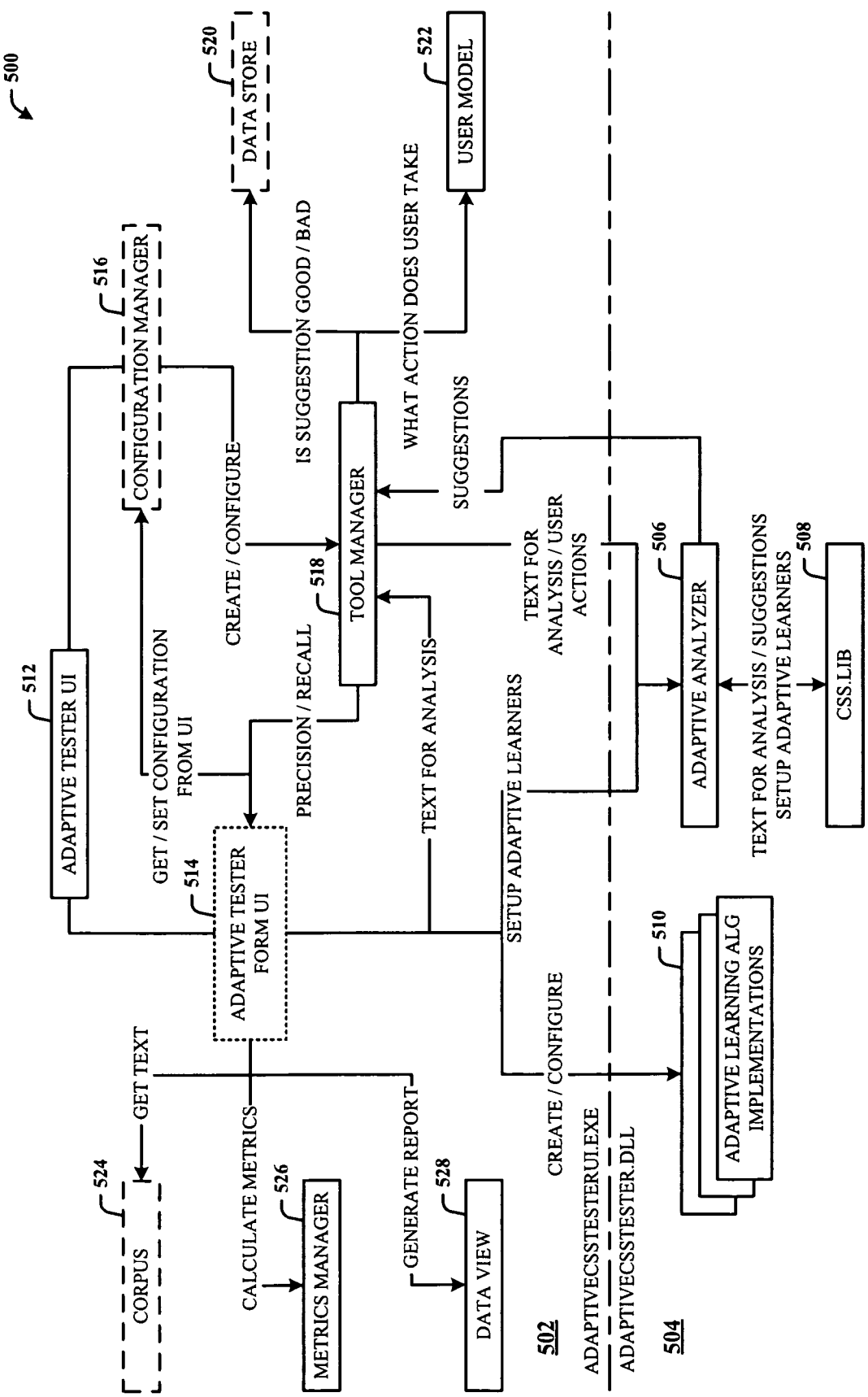
FIG. 5 illustrates a detailed system of classes employed in an exemplary test framework.

FIG. 5 illustrates a detailed system 500 of classes employed in an exemplary test framework. The use of "CSS" is synonymous with "text correction tool" throughout this description. On top of the changes to the text correction tool, the AdaptiveAnalyzer managed/unmanaged bridge and AdaptiveCSSTester are available to test the adaptive learning algorithms. A more detailed overview of the classes used in these modules follows. The different classes are illustrated in the following way: data classes as blocks with dashed lines, view/controller classes as blocks with dotted lines, and controller classes as blocks with solid lines. The system 500 illustrates the adaptive tester portion 502 and the adaptive tester DLL (dynamic link library) portion 504. The adaptive tester DLL portion 504 includes an adaptive analyzer 506 the interfaces to a tool library 508 to obtain text for analysis and suggestions, and for setup of adaptive learners. The adaptive tester DLL portion 504 also includes the tool adaptive learning algorithm implementations 510 that are the final versions of the adaptive learning algorithms created and configured for deployment with the client-side application based on other processes to be described herein.

The adaptive tester portion 502 includes an adaptive tool tester UI 512 which serves as the main user interface. The adaptive tester UI 512 interfaces to both an adaptive tester form 514 that serves as the UI for implementing a test thread, and a configuration manager 516 (which can be an XML configuration loader). The configuration manager 516 provides create and configure functionality to a tool manager 518, which provides analysis management, suggestions, and user interactions. The configuration manager 516 gets and sets the configuration from the adaptive tester form UI 514. The tool manager 518 passes precision and recall information to the adaptive tester form UI 514. The tool manager 518 also passes suggestion information (e.g., good or bad) to a data store 520 and user action information to a user model 522.

The adaptive tester form UI 514 provides access to a corpus 524 (one or more sources of real data) to obtain the corpus 524 for testing of the adaptive learning algorithms, access to a metrics manager 526 for metrics calculation and viewing, the generation of data views 528 (e.g., spreadsheet) for report generation.

The tool manager 518 obtains text for analysis from the adaptive tester form UI 514 which is then used to generate the correctly-flagged data for the data store 520 and for developing the user model 522. The adaptive tester form UI 514 facilitates the creation and configuration of the adaptive learning algorithm implementations (the learners) 510, and the setup information to the adaptive analyzer 506.

The AdaptiveCSSTester tool can be configured using a series of XML configuration files that are described in the following below. To use any given configuration file, the file is loaded using the adaptive tester UI 512.

The corpus configuration file specifies the corpus, original and corrected text, as well as various configuration parameters such as whether to start automatically, etc. In addition, the corpus configuration file can either specify a single user model and learner configuration or link to external user model and learner configuration files.

A sample configuration is below. Note that the order of the nodes is not important. Any missing nodes will be given default values.

```
<AdaptiveCssTesterConfig>
```

Corpus Configuration Section:

```
<CorpusDataFile>C:\dasovich-j.txt</CorpusDataFile>
<ErkDataFile>C:\dasovich-j-erks.txt</ErkDataFile>
<StatisticsFile>C:\oldnewthing-cm.csv</StatisticsFile>
```

Iterations and Passes Configuration:

```
<Iterations>6</Iterations>
<Passes>1</Passes>
```

Arguments for the Text Correction Tool (Changing General Scoring Model Parameters)

```
<CSSArguments>-CMBase -900</CSSArguments>
```

Configuration for Automatic Start/Exit:

```
<AutoStart>false</AutoStart>
<ExitOnFinish>false</ExitOnFinish>
```

User Model Configuration:

```
<ProbIdentifyGood>1</ProbIdentifyGood>
<ProbIdentifyBad>1</ProbIdentifyBad>
<ProbActionOnGood>1</ProbActionOnGood>
<ProbActionOnBad>1</ProbActionOnBad>
```

Learner Configuration:

```
<AdaptiveLearners>
<AdaptiveLearner type="Logging" />
<AdaptiveLearner type="CappedStabilizingCM">
<BaseAcceptScore>0.2</BaseAcceptScore>
<EndAcceptScore>0.1</EndAcceptScore>
<BaseRejectScore>-3.6</BaseRejectScore>
<EndRejectScore>-1.8</EndRejectScore>
<AcceptScoreSpeed>10</AcceptScoreSpeed>
<RejectScoreSpeed>10</RejectScoreSpeed>
<AcceptScoreMidPoint>100</AcceptScoreMidPoint>
<RejectScoreMidPoint>100</RejectScoreMidPoint>
<UpperCap>300</UpperCap>
<LowerCap>-2700</LowerCap>
<UpperCapSpeed>20</UpperCapSpeed>
<LowerCapSpeed>10</LowerCapSpeed>
<UnflaggedMultiplier>0.2</UnflaggedMultiplier>
</AdaptiveLearner>
</AdaptiveLearners>
</AdaptiveCssTesterConfig>
```

The user model configuration and learner configuration sections can be replaced as follows in order to link to external configuration files:

User Model External Configuration:

```
<UserModelConfigurations>
<UserModelConfiguration>C:\usermodelconfig1.-
xml</UserModelConfiguration>
<UserModelConfiguration>C:\usermodelconfig2.-
xml</UserModelConfiguration>
</UserModelConfigurations>
```

Learner External Configuration:

```
<AdaptiveLearnerConfigurations>
  <AdaptiveLearnerConfiguration>C:\learnerconfig1.-
  xml</AdaptiveLearnerConfiguration>
  <AdaptiveLearnerConfiguration>C:\learnerconfig2.-
  xml</AdaptiveLearnerConfiguration>
</AdaptiveLearnerConfigurations>
```

When using external configurations the tool uses all possible combinations of user models/learners. For example, in this case, the tool uses user model 1 and learner 1, user model 1 and learner 2, user model 2 and learner 1, and user model 2 and learner 2.

The user model configuration file can be linked to from a corpus configuration file to specify a user model based on the good-flag and bad-flag probabilities described before. For example:

```
<UserModelConfiguration>
  <ProbIdentifyGood>1</ProbIdentifyGood>
  <ProbIdentifyBad>1</ProbIdentifyBad>
  <ProbActionOnGood>1</ProbActionOnGood>
  <ProbActionOnBad>1</ProbActionOnBad>
</UserModelConfiguration>
```

The learner configuration file configures the set of adaptive learning algorithm implementations 510 to be used for a particular test run. A way to generate a configuration file with all the correct parameters is to start the tool and configure using the tester UI 512 and then save the configuration to a file. Once saved, the parameter values may be adjusted. A sample configuration follows:

```
<AdaptiveLearners>
  <AdaptiveLearner type="Logging" />
  <AdaptiveLearner type="CappedStabilizingCM">
    <BaseAcceptScore>0.2</BaseAcceptScore>
    <EndAcceptScore>0.1</EndAcceptScore>
    <BaseRejectScore>-3.6</BaseRejectScore>
    <EndRejectScore>-1.8</EndRejectScore>
    <AcceptScoreSpeed>10</AcceptScoreSpeed>
    <RejectScoreSpeed>10</RejectScoreSpeed>
    <AcceptScoreMidPoint>100</AcceptScoreMidPoint>
    <RejectScoreMidPoint>100</RejectScoreMidPoint>
    <UpperCap>300</UpperCap>
    <LowerCap>-2700</LowerCap>
    <UpperCapSpeed>20</UpperCapSpeed>
    <LowerCapSpeed>10</LowerCapSpeed>
    <UnflaggedMultiplier>0.2</UnflaggedMultiplier>
  </AdaptiveLearner>
</AdaptiveLearners>
```

Each adaptive learning algorithm of the implementations 510 can have different parameters, which are described herein, and discoverable via the tester UI 512.

The CM adaptive learning algorithm significantly improves precision, especially in cases where the user uses words in a context not captured by LM training data. With users that are generally more accurate on the common errors, up to a 30% increase in precision can be obtained with only a 10-15% drop in recall.

Figure 6:
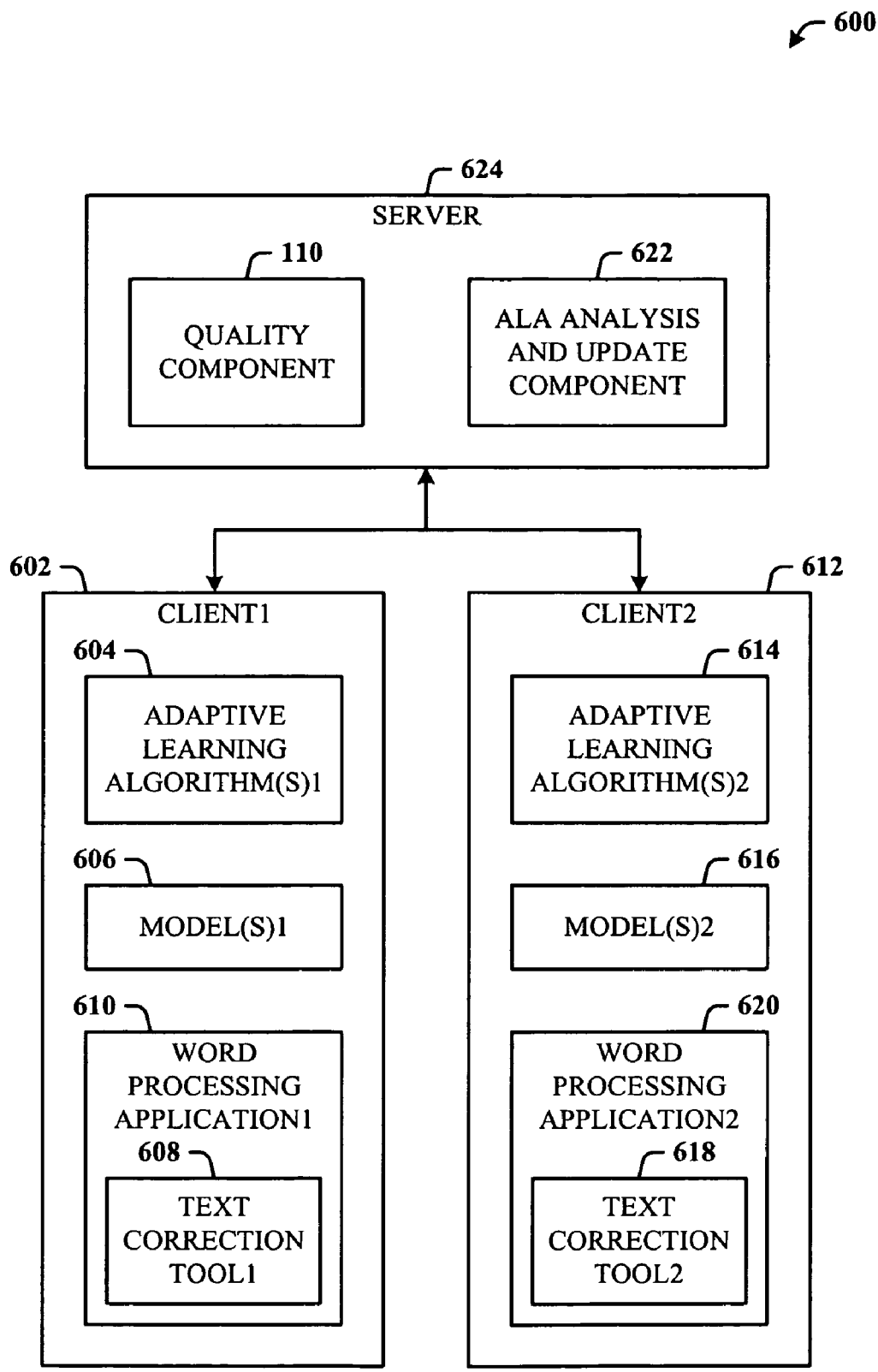
FIG. 6 illustrates a system that learns from and applies model updates to client systems that employ adaptive learning algorithms used by word processing applications.

FIG. 6 illustrates a system 600 that learns from and applies model updates to client systems that employ adaptive learning algorithms used by word processing applications. Here, a first client 602 includes one or more adaptive learning algorithm(s) (ALA) 604 operating in combination with one or more first client models 606 (e.g., channel model and/or language model) to provide model data for a first client text correction tool 608 embodied as part of a first word processing application 610. Similarly, a second client 612 includes one or more adaptive learning algorithm(s) (ALA) 614 operating in combination with one or more second client models 616 (e.g., channel model and/or language model) to provide model data for a second client text correction tool 618 embodied as part of a second word processing application 620.

As a user of the first word processing application 610 receives flagged text in a word document (or a compatible document format), for example, the user can interact to accept the flagged text or reject the flagged text. The text is flagged based on the one or more first client model(s) 606, which model(s) 606 are updated by the first client adaptive learning algorithm(s) 604. The effectiveness of the first client adaptive learning algorithm(s) 604 can be monitored by an ALA analysis and update component 622 of a server 624 that gathers effectiveness data from many clients to determine when to re-test adaptive learning algorithm(s) for updating and download to the clients (e.g., the first client 602). The re-testing can be performed by the server-based quality component 110 to effect changes to the algorithms (e.g., masters) stored on the server for revision and download. This provides a more global consistency in client text correction operations. Alternatively, the clients (602 and 612) operate independently without updates from the server 624, updates on request, or periodic updates, for example.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be required for a novel implementation.

Figure 7:
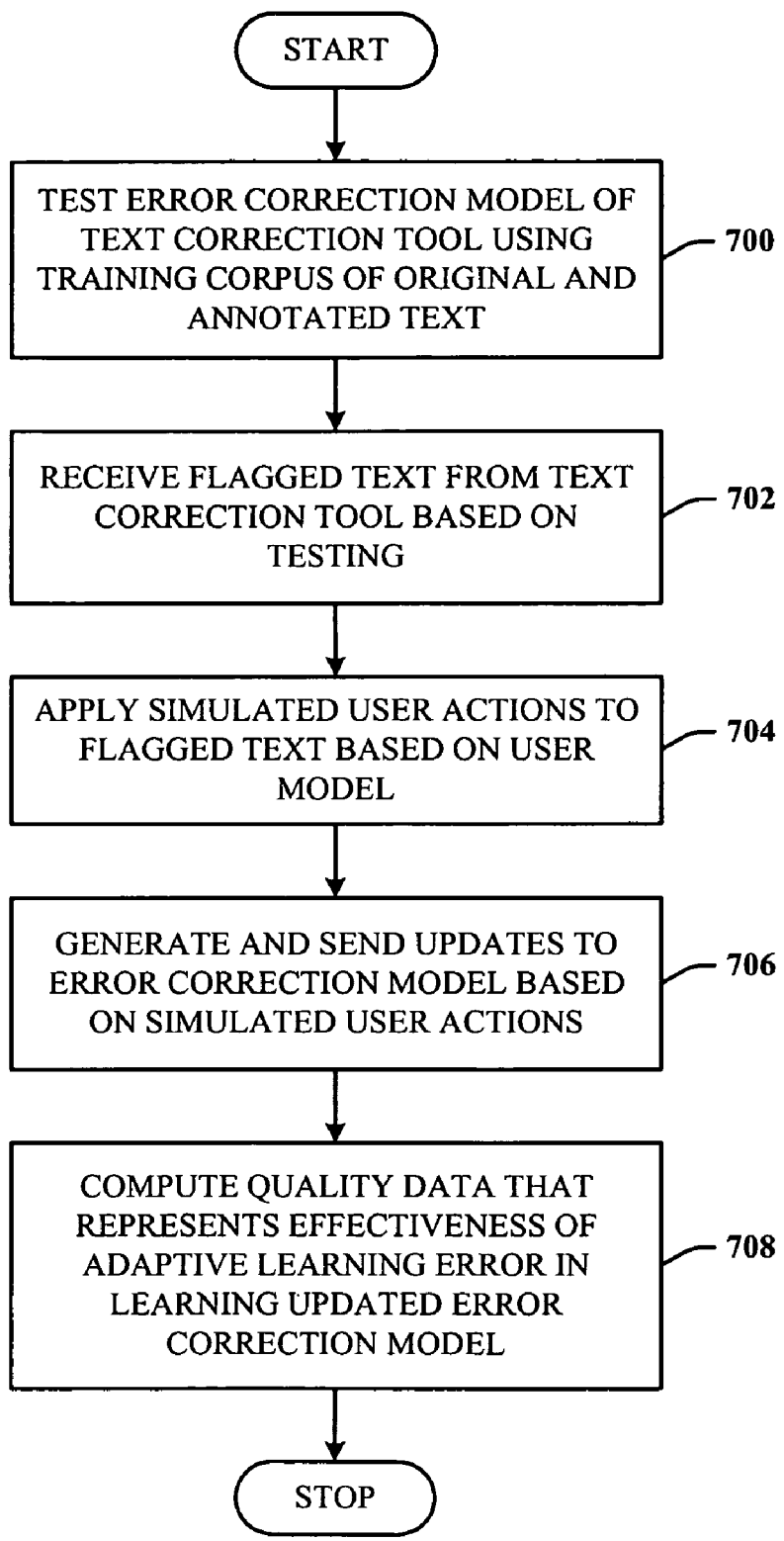
FIG. 7 illustrates a computer-implemented method of analyzing effectiveness of a text correction tool.

FIG. 7 illustrates a computer-implemented method of analyzing effectiveness of a text correction tool. At 700, an error correction model of a text correction tool is tested using a training corpus of original text and annotated text. At 702, flagged text is received from the text correction tool based on the testing. At 704, simulated user actions are applied to the flagged text based on a user model. At 706, updates to the error correction model are generated and sent. At 708, quality data is computed that represents effectiveness of the adaptive learning algorithm in learning the updated error correction model.

The method can further comprise deploying the text correction tool and associated error correction model to learn individualized correction behavior of an end-user, and generating the training corpus to retain positions of the annotated text in a document and relative to surrounding context, and occurrences of the correctly-flagged text in the document.

The method can further comprise tuning the adaptive learning algorithm based on at least one of biases related to acceptance/rejection of flagged text, orthographic errors made, or frequency of use of the text in a search index. The method can further comprise limiting an amount of bias that is applied toward or against the flagged text.

The method can further comprise employing an adaptive learning algorithm that reduces a score adjustment to a model as more data is retrieved and capping adjustment of the score using upper and lower limits, and employing an adaptive learning algorithm that learns based on implicit accepts and implicit ignores relative to the flagged text.

The method can comprise creating a user model based on probabilities of a user correctly thinking flagged text is good or bad, and probabilities based on explicit acceptance and rejection of the flagged text, and creating multiple different user models against which the effectiveness is measured.

Figure 8:
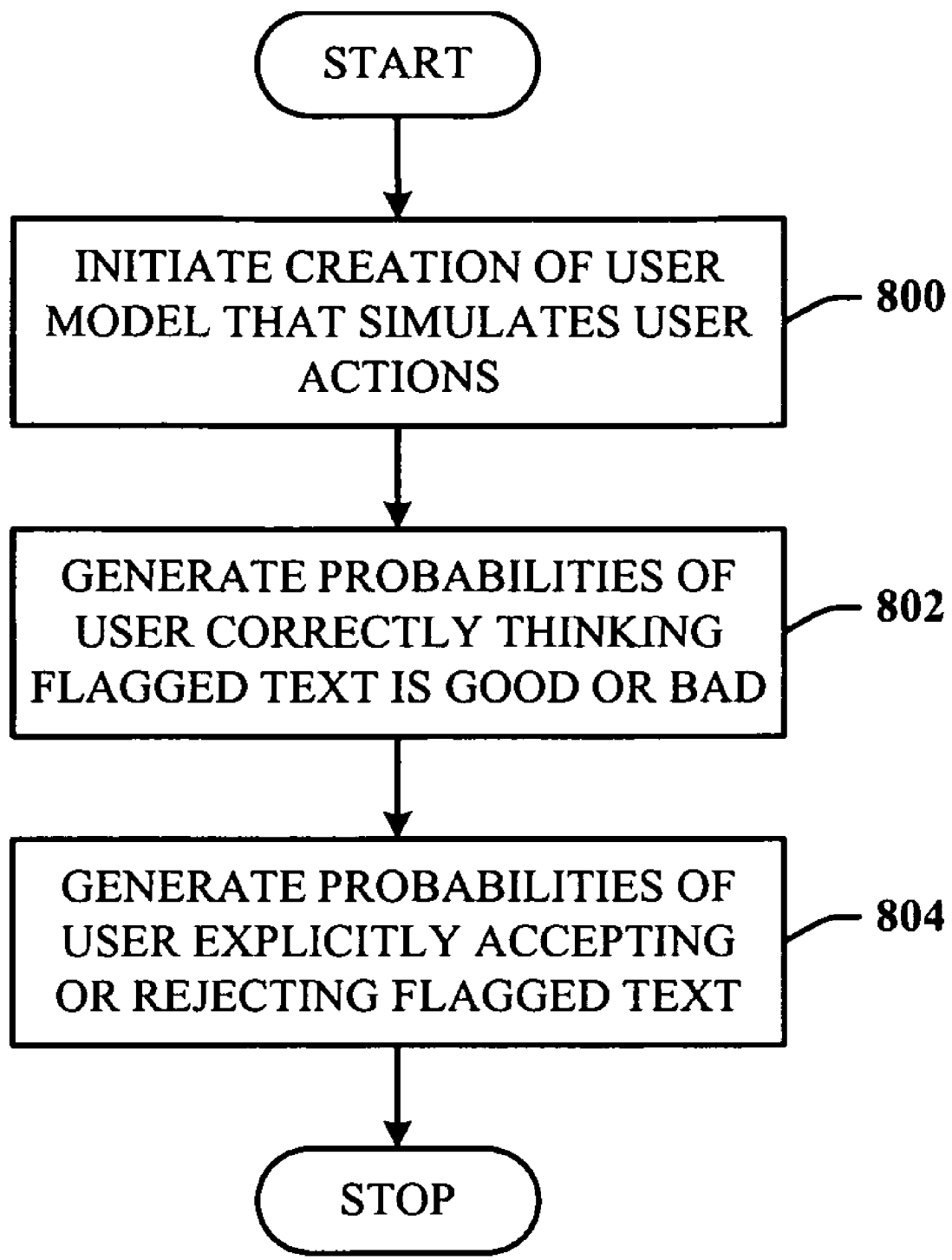
FIG. 8 illustrates a method of creating a user model for testing an adaptive algorithm.

FIG. 8 illustrates a method of creating a user model for testing an adaptive algorithm. At 800, creation of the user model is initiated. At 802, probabilities of a user correctly thinking that flagged text is good or bad are generated. At 804, probabilities of a user explicitly accepting or rejecting flagged text are generated.

Figure 9:
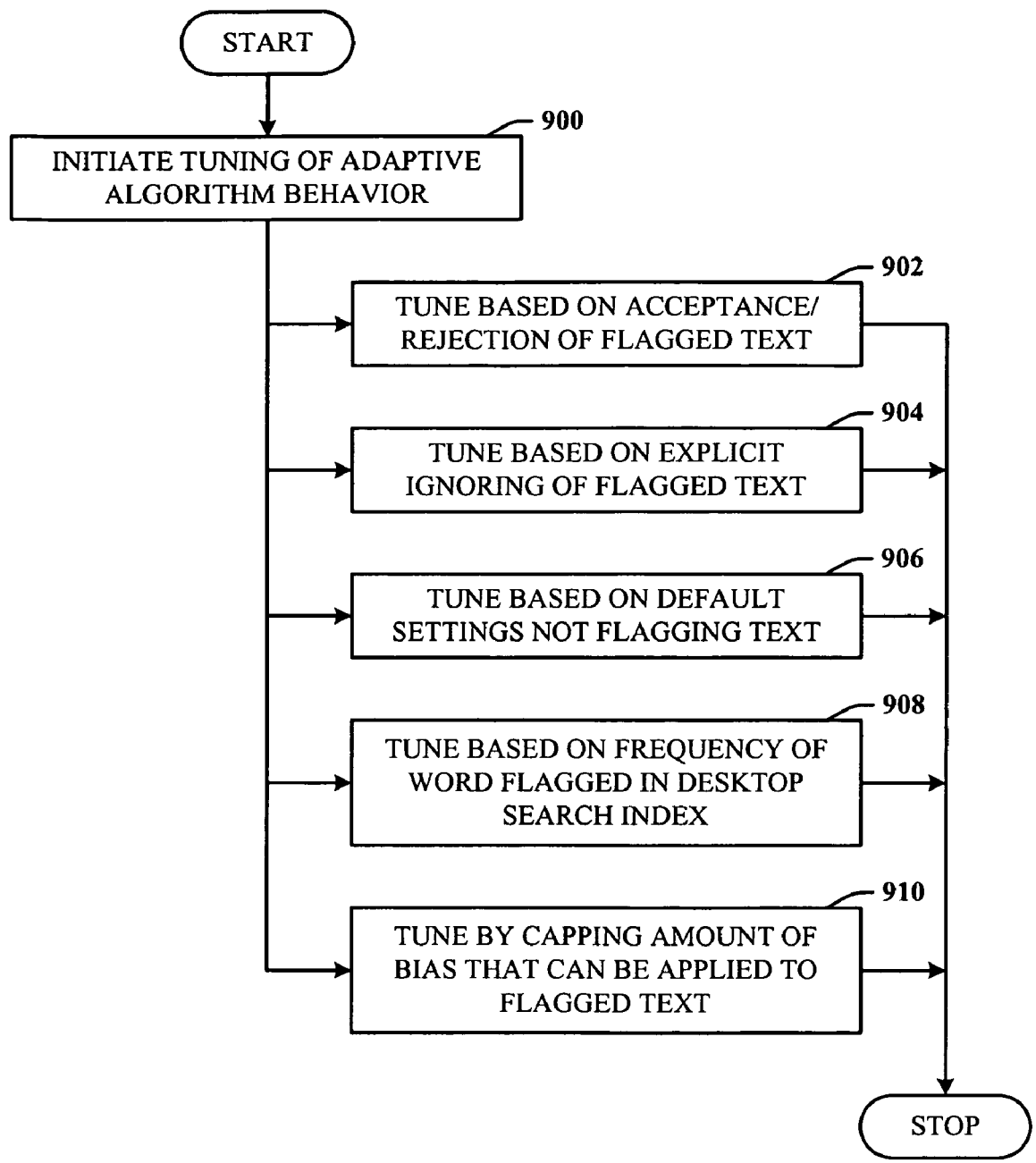
FIG. 9 illustrates a method of tuning adaptive learning algorithms.

FIG. 9 illustrates a method of tuning adaptive learning algorithms. The tuning process can include any one or more of the algorithm tuning techniques. At 900, tuning of adaptive algorithm behavior is initiated. At 902, an algorithm is tuned based on acceptance/rejection of flagged text. At 904, an algorithm is tuned based on explicit ignoring of flagged text. At 906, an algorithm is tuned based on default settings not flagging text. At 908, an algorithm is tuned based on frequency of a word flagged in a desktop search index. At 910, an algorithm is tuned by capping the amount of bias that can be applied to the flagged text.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
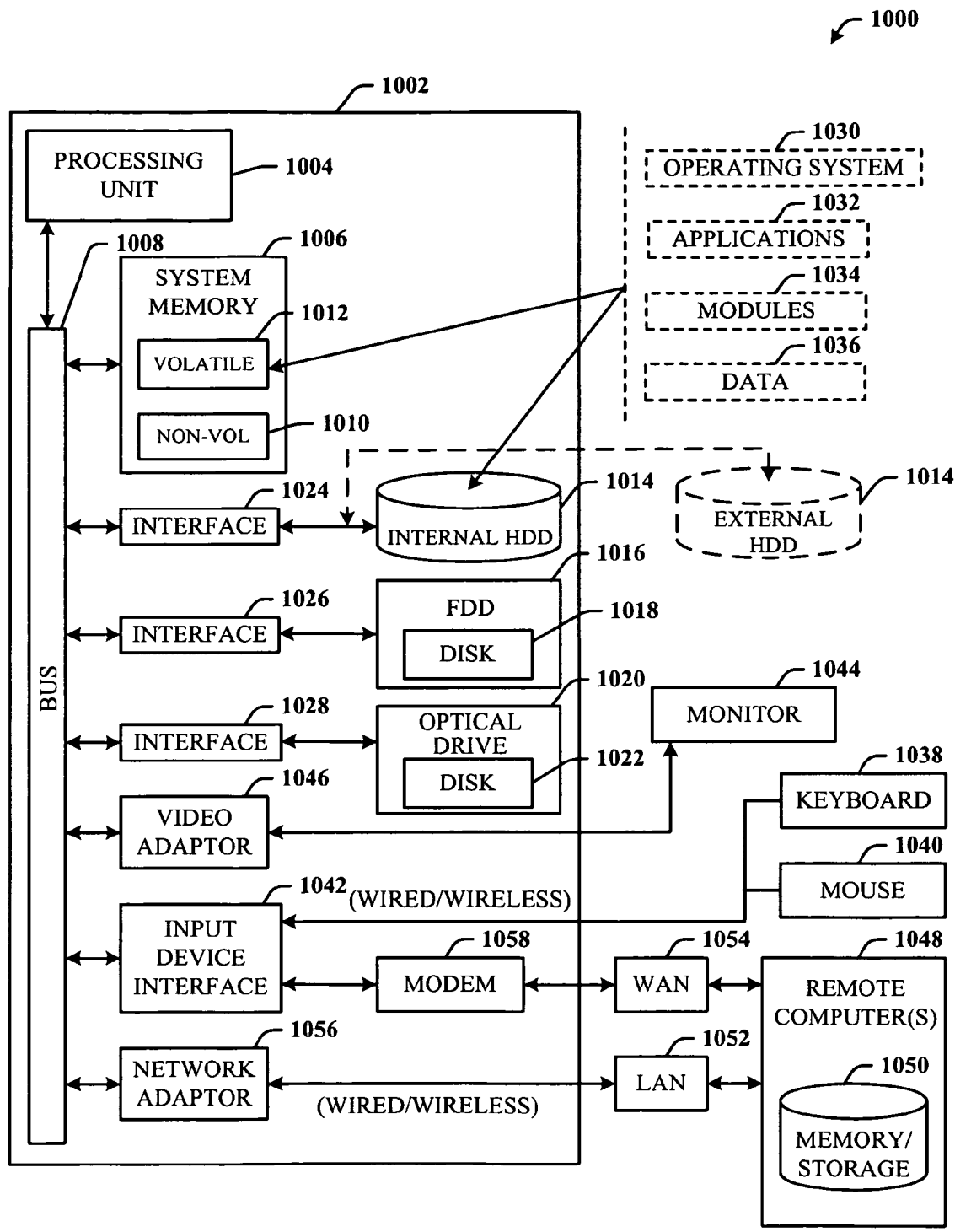
FIG. 10 illustrates a block diagram of a computing system operable to test and employ adaptive learning in combination with an application in accordance with the disclosed architecture.

Referring now to FIG. 10, there is illustrated a block diagram of a computing system 1000 operable to test and employ adaptive learning in combination with an application in accordance with the disclosed architecture. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002 having a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 can include non-volatile memory (NON-VOL) 1010 and/or volatile memory 1012 (e.g., random access memory (RAM)). A basic input/output system (BIOS) can be stored in the non-volatile memory 1010 (e.g., ROM, EPROM, EEPROM, etc.), which BIOS are the basic routines that help to transfer information between elements within the computer 1002, such as during start-up. The volatile memory 1012 can also include a high-speed RAM such as static RAM for caching data.

The computer 1002 further includes an internal hard disk drive (HDD) 1014 (e.g., EIDE, SATA), which internal HDD 1014 may also be configured for external use in a suitable chassis, a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as a DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1012, including an operating system 1030, one or more application programs 1032, other program modules 1034, and program data 1036. The one or more application programs 1032, other program modules 1034, and program data 1036 can include the components and entities of system 100, the components and entities of the system 200, the classes and entities of the system 500, the clients (602 and 612), and the methods of FIGS. 7-9, for example.

All or portions of the operating system, applications, modules, and/or data can also be cached in the volatile memory 1012. It is to be appreciated that the disclosed architecture can be implemented with various commercially available operating systems or combinations of operating systems.

A user can enter commands and information into the computer 1002 through one or more wire/wireless input devices, for example, a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, etc.

A monitor 1044 or other type of display device is also connected to the system bus 1008 via an interface, such as a video adaptor 1046. In addition to the monitor 1044, a computer typically includes other peripheral output devices (not shown), such as speakers, printers, etc.

The computer 1002 may operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 11:
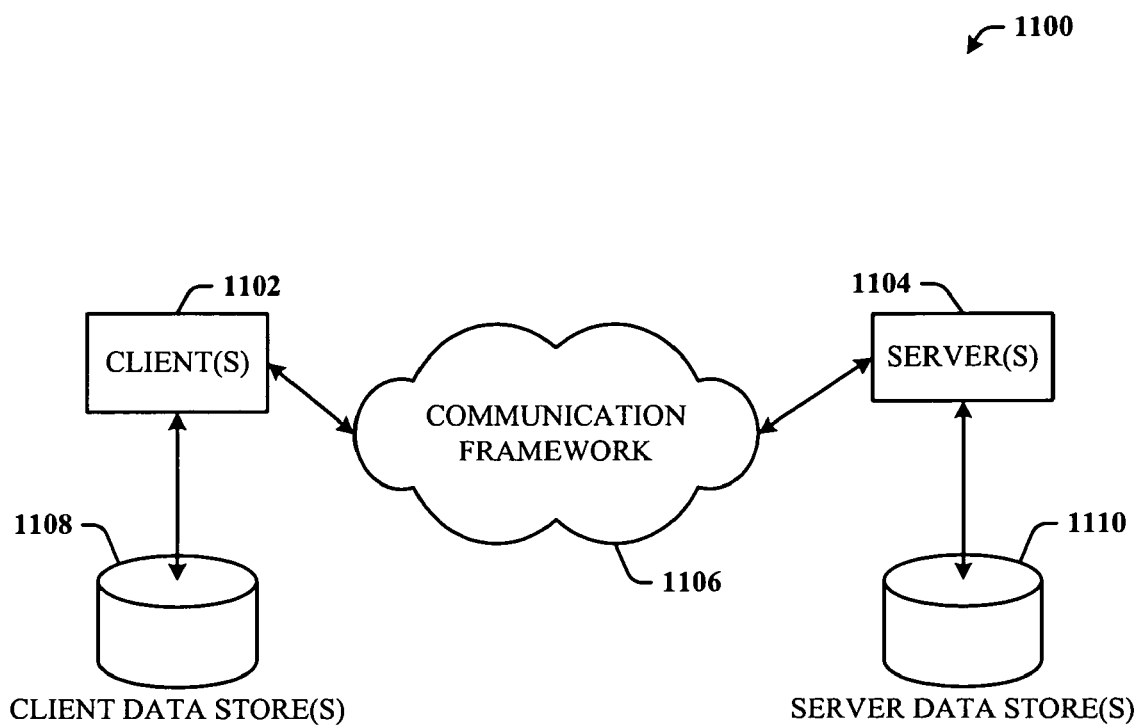
FIG. 11 illustrates a schematic block diagram of an exemplary computing environment for adaptive algorithm testing and implementation.

Referring now to FIG. 11, there is illustrated a schematic block diagram of an exemplary computing environment 1100 for adaptive algorithm testing and implementation. The environment 1100 includes one or more client(s) 1102. The client(s) 1102 can be hardware and/or software (e.g., threads, processes, computing devices). The client(s) 1102 can house cookie(s) and/or associated contextual information, for example.

The environment 1100 also includes one or more server(s) 1104. The server(s) 1104 can also be hardware and/or software (e.g., threads, processes, computing devices). The servers 1104 can house threads to perform transformations by employing the architecture, for example. One possible communication between a client 1102 and a server 1104 can be in the form of a data packet adapted to be transmitted between two or more computer processes. The data packet may include a cookie and/or associated contextual information, for example. The environment 1100 includes a communication framework 1106 (e.g., a global communication network such as the Internet) that can be employed to facilitate communications between the client(s) 1102 and the server(s) 1104.

Communications can be facilitated via a wire (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

The client(s) 1102 can include the clients (602 and 612), and the server(s) 1104 can include the server 624. The training corpus 202 can be obtained from enterprise sources, for example, which can be the server data stores 1110.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented data correction system, comprising:
one or more memories operatively coupled to one or more processors providing:
an adaptive learning component for learning an updated error correction model based on input actions related to correction of data, the adaptive learning component includes one or more adaptive learning algorithms reducing a score adjustment to a model as more data is retrieved and capping the score adjustment using upper and lower limits; and
a quality component for computing effectiveness of the adaptive learning component for learning the updated error correction model.

2. The system of claim 1, wherein the data is text and the adaptive learning component is employed in a word processing application to update models related to correction of the text.

3. The system of claim 1, wherein the quality component employs a corpus of original text and annotated text for processing through a correction tool to check quality of the updated error correction model, the quality defines the effectiveness of the adaptive learning component.

4. The system of claim 1, wherein the input actions are simulated user actions based on a user model as processed by a simulation tool.

5. The system of claim 4, wherein the quality component comprises a training corpus that includes original text, annotated text, position of the annotated text in a document, and position of the annotated text relative to surrounding context.

6. The system of claim 1, wherein the quality component further tests the effectiveness of the adaptive learning component to learn the updated error correction model related to checking grammar.

7. The system of claim 1, wherein the quality component further tests the effectiveness of the adaptive learning component to learn the updated error correction model related to checking spelling.

8. A computer-implemented data correction system, comprising:
one or more memories operatively coupled to one or more processors providing:
an adaptive learning component for learning an updated error correction model based on input actions related to correction of text of a document created via a word processor;
a text correction tool of the word processor for flagging new text for correction based on the updated error correction model; and
a user model created based on probabilities of a user thinking flagged text is good or bad, and probabilities based on explicit acceptance and rejection of the flagged text.

9. The system of claim 8, further comprising a quality component for computing effectiveness of the adaptive learning component for learning the updated error correction model by comparing original text and annotated text of a training corpus to newly-corrected text of the text correction tool.

10. The system of claim 8, wherein the adaptive learning component includes an adaptive learning algorithm that adjusts the updated error correction model based on scores associated with acceptance or rejection of a suggested text correction.

11. The system of claim 8, wherein the adaptive learning component includes an adaptive learning algorithm that adjusts the updated error correction model based on scores associated with acceptance or rejection of a suggested text correction, the adaptive learning algorithm adjusts the scores over time, and limits score adjustment based on at least one of a maximum limit or a minimum limit.

12. A computer-implemented method of analyzing effectiveness of a text correction tool, comprising:
testing an error correction model of the text correction tool using a training corpus of original text and annotated text;
receiving flagged text from the text correction tool based on the testing;
applying simulated user actions to the flagged text based on a user model;
employing an adaptive learning algorithm that learns based on implicit accepts and implicit ignores relative to the flagged text;
generating and sending updates to the error correction model based on the simulated user actions; and
computing quality data that represents effectiveness of the adaptive learning algorithm in learning the error correction model.

13. The method of claim 12, further comprising deploying the text correction tool and associated error correction model to learn individualized correction behavior of an end-user.

14. The method of claim 12, further comprising generating the training corpus to retain positions of the annotated text in a document and relative to surrounding context, and one or more occurrences of correctly-flagged text in the document.

15. The method of claim 12, further comprising tuning the adaptive learning algorithm based on at least one of biases related to acceptance/rejection of flagged text, orthographic errors made, or frequency of use of the flagged text in a search index.

16. The method of claim 12, further comprising limiting an amount of bias that is applied toward or against the flagged text.

17. The method of claim 12, further comprising employing the adaptive learning algorithm that reduces a score adjustment to a model as more data is retrieved and capping adjustment of the score using upper and lower limits.

18. The method of claim 12, further comprising creating the user model based on probabilities of a user correctly thinking flagged text is good or bad, and probabilities based on explicit acceptance and rejection of the flagged text.

19. The method of claim 12, further comprising creating multiple different user models against which the effectiveness is measured.

20. The method of claim 12, further comprising tuning the adaptive learning algorithm based on frequency of use of the flagged text in a desktop search index.

* * * * *